Figure 1:
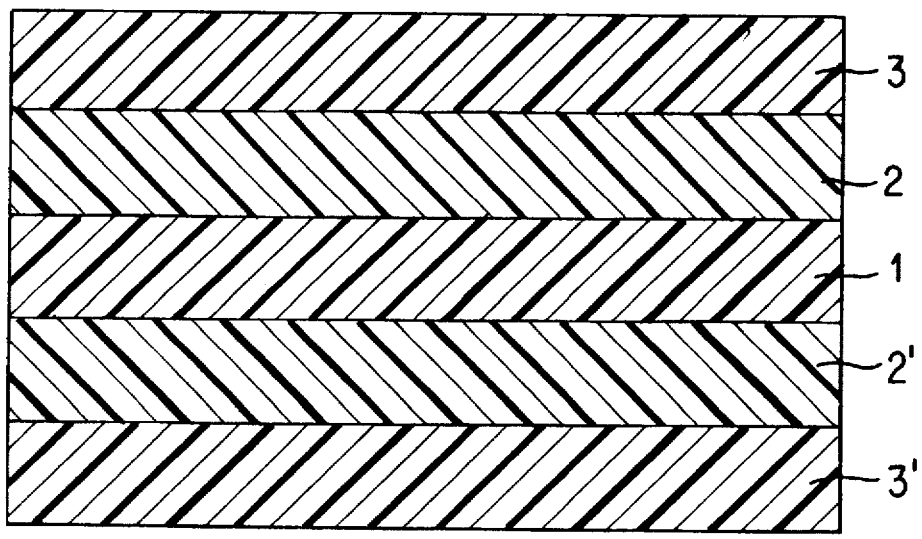

United States Patent
Ciocca et al.

[11] Patent Number: 5,766,772
[45] Date of Patent: Jun. 16, 1998

[54] ANTI-FOG FILM, METHOD OF PACKAGING PRODUCTS HAVING HIGH MOISTURE CONTENT AND PRODUCTS THUS PACKAGED

[75] Inventors: Paolo Ciocca, Lumellogno; Livio Buongiorno, Milan; Serge Bax, Pogliono Milanese, all of Italy

[73] Assignee: W. R. Grace & Co.-Conn., Duncan, S.C.

[21] Appl. No.: 687,544

[22] PCT Filed: Jan. 11, 1995

[86] PCT No.: PCT/US95/00394

§ 371 Date: Nov. 21, 1996

§ 102(e) Date: Nov. 21, 1996

[87] PCT Pub. No.: WO95/18845

PCT Pub. Date: Jul. 13, 1995

[30] Foreign Application Priority Data

Jan. 11, 1994 [IT] Italy ............... MI94 A 000015

[51] Int. Cl.⁶ ............................................. B32B 27/08
[52] U.S. Cl. .................... 428/516; 428/500; 428/910; 428/513; 229/87.08; 264/176.1; 426/129
[58] Field of Search .......................... 428/500, 516, 428/910, 913; 229/87.08, 87.01; 426/125; 264/564, 176.1

[56] References Cited

U.S. PATENT DOCUMENTS

| | | | |
|---|---|---|---|
| 3,048,263 | 8/1962 | Sacks et al. | 206/45.33 |
| 3,048,266 | 8/1962 | Hackhel et al. | 206/45.34 |
| 4,082,877 | 4/1978 | Shadle | 428/35 |
| 4,306,041 | 12/1981 | Cozewith et al. | 526/65 |
| 4,532,189 | 7/1985 | Mueller | 428/516 |
| 4,551,380 | 11/1985 | Schoenberg | 428/218 |
| 4,643,943 | 2/1987 | Schoenberg | 428/339 |
| 4,927,708 | 5/1990 | Herran et al. | 428/332 |
| 5,306,745 | 4/1994 | Herran et al. | 523/205 |

FOREIGN PATENT DOCUMENTS

| | | |
|---|---|---|
| 0 087 080 | 2/1983 | European Pat. Off. |
| 0 217 596 | 9/1986 | European Pat. Off. |
| 0 236 099 | 2/1987 | European Pat. Off. |
| 0561 428 A1 | 2/1987 | European Pat. Off. |
| 0 286 430 | 4/1988 | European Pat. Off. |
| 0 416 815 A2 | 8/1990 | European Pat. Off. |
| 0 435 498 | 12/1990 | European Pat. Off. |
| 1286750 | 1/1969 | Germany |
| 53033249A | 3/1978 | Japan |
| 59226047 | 12/1984 | Japan |
| 4007149A | 1/1992 | Japan |
| WO 84/03296 | 8/1984 | WIPO |

*Primary Examiner*—E. Rollins Buffalow
*Attorney, Agent, or Firm*—Mark B. Quatt

[57] ABSTRACT

A multi-layer heat-shrinkable film endowed with high anti-fog properties, and having a barrier layer (1), an adhesive layer (2, 2'), and an adhesive layer (3, 3'), wherein at least one external layer (3, 3') is made of a polyolefinic polymer. Said anti-fog properties are obtained by incorporating in said film from 1 to 5% by weight of a composition comprising (i) a glycerol mono-ester of a saturated or unsaturated fatty acid having from 8 to 20 carbons, (ii) a glycerol di-ester of a saturated or unsaturated fatty acid having from 8 to 20 carbons, and (iii at least one polyoxyethylene ether of a fatty alcohol having from 8 to 20 carbons.

16 Claims, 1 Drawing Sheet

ANTI-FOG FILM, METHOD OF PACKAGING PRODUCTS HAVING HIGH MOISTURE CONTENT AND PRODUCTS THUS PACKAGED

DESCRIPTION

The present invention relates to a film endowed with high anti-fog properties, a method for packaging products having a high moisture content and products thus packaged.

In particular, the invention relates to a thermoplastic polyolefin film with high anti-fog properties wherein said properties are obtained by incorporation of a composition comprising the following additives (i) a mono-ester of glycerol with a saturated or unsaturated fatty acid, (ii) a di-ester of glycerol with a saturated or unsaturated fatty acid, (iii) at least one ether of a polyoxyethylene with a fatty alcohol.

With the term "anticondensation" (or, to use the English term more immediately evident to the person skilled in the art, "anti-fog"), it is meant the capability of the film to prevent water vapour from condensing onto its surface in the form of small water drops redistributing them in the form of a continuous film of water in a very thin layer.

In fact, it is common practice in supermarkets to package perishable food products, such as fresh meat cuts, vegetables, cooked food, deep-frozen food and the like, in trays of different materials and shapes, wrapped in a transparent, heat-shrinking film, through which it is very important for the product to be clearly visible. With films that have no anti-fog properties, in the case for instance of easily-perishable food products, having a high moisture content, there will be a rapid condensation of water vapour and the formation of droplets on the internal surface of the film with the consequent loss of transparency of the packaging. This occurs especially when, after packaging, the product is subjected to sharp and substantial changes in temperature, such as, for example, when it is subjected to refrigeration or deep-freeze cooling.

This phenomenon occurs to a greater or to a lesser extent depending on the type of polymer or of the blend of polymers of which the film is made or, in the case of a multi-layer film, of which is made the surface layer facing the content of the tray. More particulararly, this phenomenon occurs to a greater or to a lesser extent depending on the greater or lesser hydrophobic properties of said polymer or said blend. Indeed, even if this phenomenon is common to all types of film that do not contain suitable anti-fog additives, it is especially important when said polymer or said blends are polyolefinic in nature.

Several very large families of potentially anti-fog compounds, as well as their use in film compositions used to produce film for food-wrapping uses, have been studied for a number of years.

Examples of such families comprise sorbitan esters of aliphatic carboxylic acids, glycerol esters of aliphatic carboxylic acids, esters of other polyhydric alcohols with aliphatic carboxylic acids, polyoxyethylene compounds, such as the polyoxyethylene sorbitan esters of aliphatic carboxylic acids and polyoxyethylene ethers of higher aliphatic alcohols.

The literature is rich in papers relating to investigations to find which are the specific members of the abovementioned families that, alone or in admixture among them, impart the maximum anti-fog properties to one or to the other type of film-forming composition but general criteria suitable for predicting which is the most effective anti-fog composition for each type of film-forming composition do not yet exist. In this field, experiments continue to offer new and unexpected results.

The publication—even recent—of various patent applications concerning anti-fog compositions made of members belonging to the abovementioned families is a clear indication of the fact that an optimunm solution of the problem has not yet been found and that the search for new compositions capable of improving the results attained thus far, in terms of anti-fog properties, or of guaranteeing their reproducibility under increasingly severe conditions or—again—of simplifying the process of obtaining films having the desired anti-fog properties, is still open.

In particular, the need is still very keenly felt of a composition capable of imparting the maximum possible anti-fog properties to polyolefinic layers of irradiated heat-shrinkable films.

Irradiation is a cross-linking treatment of the polymeric material performed by bombarding a film with accelerated electrons to the aim of increasing its structural resistance, to enhance its optical properties and the properties at high temperature.

It is generally carried out before the possible stretching step and it is typically made in range of from about 1 to about 13 MRad.

It is a highly energetic process capable of degrading the smaller and weaker organic molecules, such as is typically the case with the molecules of the various additives, thus including the anti-fog additives.

It is therefor a first object of the present invention to provide a mono- or multi-layer thermoplastic film having at least one external layer of a polyolefinic polymer endowed with very high anti-fog properties which are immediately manifest and last for a long time.

A second object of this invention is to provide a heat-shrinkable, thermoplastic film that is capable of maintaining such outstanding properties even after irradiation.

A third object of the present invention is to provide a method for packaging a product having a high moisture content with a heat-shrinkable, thermoplastic film, having the abovementioned characteristics, wherein said film is not in contact with the packaged product.

A further object of the present invention is to provide a package comprising a product having a high moisture content placed in a suitable tray and wrapped by a shrunk film having the abovementioned properties.

Such objects have been attained with the present invention that, as a first object, provides a mono- or multi-layer heat-shrinkable film, endowed with high anti-fog properties wherein at least one external layer is made of a polyolefinic polymer, characterized in that said anti-fog properties are obtained incorporating in said film from about 1 to about 5% by weight of a composition comprising (i) a glycerol mono-ester of a saturated or unsaturated fatty acid having from 8 to 20 C, (ii) a glycerol di-ester of a saturated or unsaturated fatty acid having from 8 to 20 C, and (iii) at least a polyoxyethylene ether of a fatty alcohol having from 8 to 20 C, wherein the weight ratio of the combined esters (i) and (ii), to the weight of the ether (iii) is in the range of from about 2:1 to about 1:4.

In general, the percent ratio of the weight of the mono-ester (i) to the total weight of both mono-ester (i) and the di-ester (ii) may range from about 0.1 to about 0.9; it shall range preferably from about 0.25 to about 0.75 and even more preferably from about 0.4 to about 0.6.

Preferably, the saturated or unsaturated fatty acid has from 12 to 20 C and when it is unsaturated it may have one or more unsaturations. Examples of suitable fatty acids are lauryl acid, palmitic acid, stearic acid, oleic acid, linoleic acid, linolenic acid and the like. Preferred acids are stearic acid and oleic acid and more preferred is oleic acid. According to a particularly preferred embodiment the mono-ester and the di-ester are both derived from the same fatty acid.

Generally the polyoxyethylene ether is a mixture of reaction products of ethylene oxide with one or more fatty alcohols having from 8 to 20 C and, preferably, of products obtained by reacting from 2 to 5 moles of ethylene oxide per mole of fatty alcohol. Preferably, the fatty alcohol has from 8 to 18 C. Examples of suitable fatty alcohols are lauryl alcohol, myristyl alcohol, palmityl alcohol and stearyl alcohol and their mixtures. A particularly preferred mixture is that of lauryl alcohol with myristyl alcohol, wherein the amount of lauryl alcohol greater than about 50%.

In this present description and in the claims, the term "polymer" comprises, but is not limited to, the homopolymers, the copolymers, the terpolymers, the block polymers, the blends thereof and their possible modified forms, as well as any possible symmetrical or asymmetrical structure consistent with their nature, e.g., syndiotactic, isotactic, atactic, thermoplastic and film-forming;

the term "polyolefin" means any thermoplastic, film-forming polymer obtained by polymerization or copolymerization of olefins with other monomers, wherein the olefin units are present in amounts greater than the other monomers. Non-limitative examples of suitable polyoelfins are: low density polyethylene (LDPE), linear low density polyethylene (LLDPE), Linear medium density polyethylene (LMDPE), Linear very-low density polyethylene (VMDPE), Linear ultra-low density polyethylene (UMDPE), high density polyethylene (HDPE), polypropylene (PP), syndiotactic polypropylene (SPP), propylene/ethylene copolymers, propylene/alpha-olefin copolymers or terpolymers, the so-called polyethylene interpolymers, that is to say the copolymers of ethylene with alpha-olefins characterized by a narrow distribution of the molecular weights and obtained by means of polymerization with metalocene catalysts (see EP-A-416, 815 and U.S. Pat. No. 4,306,041), the copolymers of ethylene with other monomers, in particular with vinyl acetate, (EVA), wherein the ethylene units are present in an amount greater than those of vinyl acetate, and the blends thereof, in any proportion;

the term "LLDPE" means the copolymers of ethylene with one or more comonomers, preferably selected among the alpha-olefins, such as butene, octene, hexene, pentene, methylpentene, etc., wherein the molecules of these copolymers comprise long chains with few branches. Generally LLDPE has a density ranging from about 0.916 g/cc to about 0.925 g/cc;

the term "LMDPE" means ethylene copolymers as defined above for LLDPE, characterized by a density usually ranging from about 0.926 g/cc to about 0.941 g/cc;

the term "VLDPE" means linear ethylene copolymers characterized by a density usually ranging from about 0.910 g/cc to about 0.860 g/cc;

the term "VLDPE" means linear ethylene copolymers characterized by a density lower than about 0.860 g/cc;

the term "EVA" identifies a copolymer formed by monomers of ethylene and vinyl acetate wherein the units derived from the ethylene monomer in the copolymer are present in a larger amount, preferably in an amount ranging from about 60 to about 98% by weight on the total weight of the copolymer.

The additives (i), (ii) and (iii) may be incorporated in the polymer or in the blend of film-forming polymers before or during extrusion.

In particular, such additives can be mixed intimately with the polymers in which they are to be incorporated, when the extruder is loaded. Or, this step of intimate mixing may be carried out beforehand, by means of the passage of the polymer and of the anti-fog additives through a single- or twin-screw extruder and the pelletization of the thus obtained product that will later be loaded as it is in the extruder. Alternatively, with this latter system, it is possible to prepare a so-called "masterbatch", in practice a polymer having a high concentration of anti-fog additives that will later be mixed with the polymer in which said composition is to be incorporated at the moment of extrusion and in an appropriate quantity to provide the desired percentage of anti-fog additives.

In this case the base polymer used for the preparation of the masterbatch can be the same as that in which it is desired to incorporate the anti-fog additives or it can also be different as long as it is compatible with the latter.

In the case of multi-layer films, the anti-fog additives of the present invention will not necessarily have to be incorporated in the polymer or in the blend of polymers forming the external layer, where the term "external layer" means that surface layer of the film that will later become the internal surface—facing the product having a high moisture content of the final package. Should the layer adjacent to the external layer allow the migration of the anti-fog additives (i), (ii) and (iii) without interfering with them, it may be expedient and will in any case be feasible, to incorporate said additives or part of them in such more internal layer.

A situation of this type takes place for sure when also the layer adjacent to the external one is a polyolefin layer as defined above. In the case of films having more than three layers, when their polymer composition allows it, it is possible and it can be expedient to incorporate the additives (i), (ii) and (iii) or part of them in an even more internal layer or to split them in all the layers.

If, as frequently occurs, the film is symmetrical, the additives (i), (ii) and (iii) can be incorprated either only in the "external layer" as defined above or, essentially for practical reasons, in both surface layers.

The total amount of the additives (i), (ii) and (iii) will be such as to represent from about 1 to about 5% and, preferably, from about 1.25 to about 3.5% by weight of the total weight of the film of this invention.

In particular, the percentage by weight of the additive (iii) on the total weight of the film of this invention will typically range from about 0.6 to about 2.9%, preferably from about 1 to about 2%, and even more preferably from about 1.2 to about 1.5%.

On the other hand, the percentage by weight of the sum of the additives (i) and (ii) will range from about 0.4 to about 2.1%, preferably from about 0.5 to about 1%, and even more preferably from about 0.6 to about 0.8% on the total weight of the film of this invention.

Other additives can obviously be added to the film-forming compositions to enhance their workability and/or other characteristics of the final film.

Among these one can mention additives in common use such as the slip and the antiblock agents; where the latter term means those substances that reduce the tendency of the films to adhere to themselves or to other surfaces.

Examples of commonly used substances which have this type of activity comprise colloidal silica, finely subdivided silica and silicone. They can be incorporated in the film-forming compositions or, in some cases, atomized on the surface of the film.

Other additives, not explicitly exemplified here, such as for example possible pigments or colourants, fungicide agents, etc., can easily be added, if required.

Any conventional technique can be used to produce films according to the present invention. In particular, either a round or a flat die may be used, quickly cooling the extruded tube or tape, respectively, and then stretching (or "orienting") it in one or both directions (longitudinal or machine direction, and transversal direction) thus obtaining a heat-shrinkable (or "oriented") film. It is also possible to stabilize the orientation of the stretched film by keeping the oriented film under suitable temperature conditions.

It is also possible to obtain a non-heat-shrinkable film using, in the extrusion step, the so-called "hot blown" technique by means of which the stretching up to the desired thickness is performed directly on the spindle before cooling.

Preferred films according to the present invention are those barrier or non-barrier films, wherein the external or the only layer comprises a polyolefin blend of at least two components wherein one is an ethylene/vinyl acetate copolymer and the other or the others are copolymers or terpolymers of ethylene with one or more alpha-olefins.

The films of this invention can have the structure disclosed in U.S. Pat. No. 4,532,189, U.S. Pat. No. 4,551,380, EP-B-87,080, EP-B-217,596, EP-B-236,099, EP-A-286,430, EP-A-435,498, and EP-A-561,428, the content of which is incorporated herein by reference.

FIG. 1 represents a preferred embodiment of a film with five layers according to the present invention; the internal layer 1 is a barrier layer preferably made from a blend of an ethylene/vinyl alcohol (EVOH) copolymer and a polyamide, the intermediate layers 2 and 2' are adhesive layers preferably made from a modified low density polyethylene and the two layers 3 and 3' are two polyolefin layers. The term "ethylene/vinyl alcohol copolymer" or "EVOH" is intended to comprise also the hydrolyzed or saponified ethylene/vinyl acetate copolymers and refers to a vinyl alcohol copolymer having an ethylene comonomer, typically present in an amount of from 15 to 65% by moles, which may be obtained, for example, by hydrolyzation of an ethylene/vinyl acetate copolymer or by chemical reaction of ethylene monomers with vinyl alcohol. When this product is obtained by hydrolyzation, the hydrolyzation degree is preferably higher than about 50%, even more preferably at least 85%.

As used herein, the term "polyamide" means polymers having a high molecular weight and amide bonds in their chain, and more specifically means synthetic polyamides such as the different types of nylon. This term also comprises polyamide copolymers such as nylon 6 and 12.

At least one of the two layers 3 and 3' contains the additives (i), (ii) and (iii) of this invention. When the abovementioned additives are incorporated only in the layer 3 or 3', in the packaging method of this present invention care will have to be taken that said layer is the one facing the product having a high moisture content placed in the tray. This precaution shall not, on the other hand, be taken when the abovementioned additives will be incorporated both in 3 and in 3'.

It is a second object of the present invention to provide a method for packaging a product having a high moisture content wherein said product is placed in a suitable tray, the tray is wrapped in a mono- or multi-layer, heat-shrinkable, thermoplastic film, the film is sealed or clipped and then shrunk in a such a way that the surface of the external layer facing said product having a high moisture content is not in contact with the same, characterized in that a film according to the present invention is used.

It is a further object of the present invention to provide a package comprising a product having a high moisture content, placed in a suitable tray and wrapped in a shrunk film not in contact with said product, characterized in that a film according to the present invention is used. As As a non-limiting example the preparation will be hereinafter described of an anti-fog film according to the present invention. It is understood that on the basis of the above description, of the example that follows and of his own knowledge, any person skilled in the art shall thus be able to practice the present invention in any of its embodiments even when it is not described in detail.

EXAMPLE 1

An anti-fog, multi-layer, heat-shrinkable film is prepared from a blend comprising 50% (w/w) of LLDPE, 25% (w/w) of LMDPE and 25% (w/w) of EVA (having a content of vinyl acetate of about 3.6% by weight). To this blend there is added a mixture of glycerol mono- and di-oleate (ATMER™121—sold by ICI), a mixture of ethers of polyoxyethylene with fatty alcohols (C12–C14) (MERGITAL™ LM3 sold by Henkel) and conventional antiblocking agents. The ratio by weight of ATMER™ to MERGITAl™ LM3 is about 2:1 and their total content is about 2% of the total weight of the film.

This blend for the two external layers is coextruded with an internal (core) layer made of a blend of 90% of EVOH and 10% of a nylon 6/nylon 12 copolymer and two intermediate adhesive layers made of a low density polyethylene modified with anhydride groups.

The film is obtained by "cast" extrusion, cross-linking by irradiation at about 4MRad, and finally by air-bubble orientation with a stretching ratio of about 3.5:1 in both directions.

In order to assess the anti-fog properties of the thus obtained film a standard procedure is used wherein film samples are employed to hand-package trays having a 0.5 l capacity and containing about 200 ml of tap water at a temperature of about 15° C., and the film is then shrunk with hot air. These trays are then placed in a refrigerator at a temperature of from 2° to 4° C. and the formation of fog is monitored as well as its possible disappearance after 5', 20', 2h, 24h, 2d, 4d, 6d, 8d and 10d.

The results, at each time, are assessed on a scale from 1 to 5 with the following meanings:

5=excellent—the bottom of the tray is clearly visible through the film and there are no drops of water on the film itself;

4=good—the bottom of the tray is clearly visible but a few droplets of water are present in a limited quantity on the surface of the film;

3=acceptable—the bottom of the tray can be seen in spite of the presence of a certain number of droplets on the surface of the film;

2=poor—it is difficult to see the bottom of the tray due to the considerable number of water droplets on the surface of the film;

1=very poor—it is impossible to see the bottom of the tray.

In these tests, the film obtained in this Example 1 has received the assessment 5 throughout the testing time.

Films produced following the same procedure as described in this Example 1 but adding only two of the additives (i), (ii) and (iii) have received assessments that are lower in the absolute and/or have not shown a comparable activity of such long duration or of such immediate evidence.

Films having a very good anti-fog activity may be obtained following subtantially the same procedure as described in this Example 1, but replacing the polymers or their blends according to the teaching of the European patent EP-B-217.596, or following substantially the same procedure of this Example 1 but changing the total amount of the additives (i), (ii) and (iii) and/or their ratio so that the mixture of (i) and (ii) is present in a percentage quantity by weight on the total weight of the film of from about 0.5 to about 1, and that (iii) is present in a percentage quantity of from about 1 to about 2.

Films having anti-fog activities according to the present invention can also be obtained by following substantially the same procedure of this Example 1 but using a mixture of glycerol mono- and di-stearate instead of the mixture of glycerol mono- and di-oleate.

Further films that can suitably be additivated with about 1 part by weight of a mixture of glycerol mono- and di-oleate and about 2 parts by weight of ethers of polyoxyethylene with fatty alcohols having from 12 to 14 carbon atoms, in a percentage quantity by weight on the total weight of the film of from about 1.25 to about 2, are disclosed as structures I, II and III in the U.S. Pat. No. 4.551.380.

In this case the incorporation of anti-fog additives can be made in the film composition of any one of the layers.

We claim:

1. A heat shrinkable thermoplastic film having at least one external layer comprising a polyolefin, the film containing between 1% and 5%, by weight of the film, of a composition comprising:
   a) a glycerol mono-ester of a saturated or unsaturated fatty acid having between 8 and 20 C;
   b) a glycerol di-ester of a saturated or unsaturated fatty acid having between 8 and 20 C; and
   c) at least one polyoxyethylene ether of a fatty alcohol having between 8 and 20 C;
wherein the weight ratio of the combined esters a) and b) to the weight of the ether c) is between 2:1 and 1:4.

2. The film of claim 1 wherein the composition comprises between 1.25% and 3.5% by weight of the total film.

3. The film of claim 1 wherein the weight ratio between the ester a) and the sum of the esters a) and b) is between 0.25:1 and 0.75:1.

4. The film of claim 1 wherein the weight ratio between the ester a) and the sum of the esters a) and b) is between 0.4:1 and 0.6:1.

5. The film of claim 1 wherein the saturated or unsaturated fatty acid of ester a) or ester b) has between 12 and 20 C.

6. The film of claim 1 wherein the saturated or unsaturated fatty acid of ester a) or ester b) comprises oleic acid.

7. The film of claim 1 wherein the ether c) is essentially the reaction product of a mixture of fatty alcohols having between 8 and 20 C with ethylene oxide.

8. The film of claim 7 wherein the fatty alcohol has between 8 and 18 C.

9. The film of claim 7 wherein the mixture of fatty alcohols comprises a mixture of lauryl alcohol and myristyl alcohol.

10. The film of claim 1 wherein the polyolefin comprises:
    a) ethylene/vinyl acetate copolymer; and
    b) a copolymer or terpolymer of ethylene and one or more alpha-olefins.

11. The film of claim 10 comprising:
    a) an internal layer comprising a blend of ethylene/vinyl alcohol co-polymer and polyamide;
    b) two intermediate adhesive layers; and
    c) two external layers each comprising a blend of linear low density polyethylene, linear medium density polyethylene, and ethylene/vinyl acetate copolymer.

12. The film of claim 1 wherein the film is crosslinked.

13. The film of claim 1 wherein the film is oriented.

14. The film of claim 13 wherein the film is heat shrinkable.

15. A method for packaging a product comprising:
    a) placing the product in a tray;
    b) wrapping the trayed product in a heat shrinkable thermoplastic film having at least one external layer comprising a polyolefin, the film containing between 1% and 5%, by weight of the film, of a composition comprising:
       i) a glycerol mono-ester of a saturated or unsaturated fatty acid having between 8 and 20 C;
       ii) a glycerol di-ester of a saturated or unsaturated fatty acid having between 8 and 20 C; and
       iii) at least one polyoxyethylene ether of a fatty alcohol having between 8 and 20 C;
    wherein the weight ratio of the combined esters a) and b) to the weight of the ether c) is between 2:1 and 1:4;
    c) sealing or clipping the film; and
    d) shrinking the film such that a surface of the external layer facing the product is not in contact with the product.

16. A package comprising:
    a) a product disposed on a tray; and
    b) a film, in which the trayed product is wrapped and shrunk, having at least one external layer comprising a polyolefin, the film containing between 1% and 5%, by weight of the film, of a composition comprising:
       i) a glycerol mono-ester of a saturated or unsaturated fatty acid having between 8 and 20 C;
       ii) a glycerol di-ester of a saturated or unsaturated fatty acid having between 8 and 20 C; and
       iii) at least one polyoxyethylene ether of a fatty alcohol having between 8 and 20 C.

* * * * *